US008620757B2

(12) United States Patent
Kramer et al.

(10) Patent No.: US 8,620,757 B2
(45) Date of Patent: Dec. 31, 2013

(54) SYSTEM FOR PROVIDING AN ONLINE ACCOUNT STATEMENT HAVING HYPERLINKS

(75) Inventors: Kevin L. Kramer, Greenville, DE (US); William W. Wagner, Chadds Ford, PA (US); Kevin P. Wren, Wilmington, DE (US); Peter A. Tavormina, Hainesport, NJ (US); Thomas E. Boettger, Wilmington, DE (US); Sunil Mathur, Hockessin, DE (US)

(73) Assignee: Bank of America, National Association, Charlotte, NC (US)

( * ) Notice: Subject to any disclaimer, the term of this patent is extended or adjusted under 35 U.S.C. 154(b) by 1957 days.

(21) Appl. No.: 10/366,559

(22) Filed: Feb. 14, 2003

(65) Prior Publication Data

US 2004/0162778 A1 Aug. 19, 2004

Related U.S. Application Data

(63) Continuation-in-part of application No. 10/078,162, filed on Feb. 20, 2002, now abandoned.

(51) Int. Cl.
*G06Q 40/00* (2012.01)
(52) U.S. Cl.
USPC ......... 705/26.1; 705/14.1; 705/14.13; 705/23
(58) Field of Classification Search
None
See application file for complete search history.

(56) References Cited

U.S. PATENT DOCUMENTS

| | | | |
|---|---|---|---|
| 5,963,925 A * | 10/1999 | Kolling et al. | 705/40 |
| 6,327,574 B1 | 12/2001 | Kramer et al. | |
| 6,341,353 B1 * | 1/2002 | Herman et al. | 726/5 |
| 6,450,407 B1 * | 9/2002 | Freeman et al. | 235/492 |
| 6,574,606 B1 * | 6/2003 | Bell et al. | 705/14.27 |
| 6,592,044 B1 * | 7/2003 | Wong et al. | 235/493 |
| 6,697,808 B1 | 2/2004 | Hurwood et al. | |
| 6,839,682 B1 * | 1/2005 | Blume et al. | 705/7.31 |
| 6,842,739 B2 * | 1/2005 | Postrel | 705/14 |
| 7,139,762 B2 * | 11/2006 | Labarge et al. | 1/1 |

(Continued)

FOREIGN PATENT DOCUMENTS

| | | |
|---|---|---|
| WO | WO 01/35191 A2 | 5/2001 |
| WO | WO 01/80125 A2 | 10/2001 |
| WO | WO0180125 A2 * | 10/2001 |

OTHER PUBLICATIONS

Livermore Research Group, "What Was That Purchase", 2003 Livermore Research, pp. 1-15 www.livermoreresearch.com.

(Continued)

*Primary Examiner* — Gregory Johnson
(74) *Attorney, Agent, or Firm* — Banner & Witcoff, Ltd.

(57) ABSTRACT

A computer system including at least one computer-readable medium has software to provide online account statements for accounts of customers of a company. The at least one computer-readable medium includes: a transaction database comprising a transaction history for an account of a customer of the company; a merchant database comprising variations of merchant names for merchants; software to compare the merchant name of the transaction entry of the transaction history from the transaction database with the variations of merchant names from the merchant database; software to provide a hyperlinked special offer indicia if a match occurs between the merchant name from the transaction database and one of the variations of merchant names from the merchant database; and software to provide an online account statement web page to the customer via the network.

21 Claims, 15 Drawing Sheets

(56) References Cited

U.S. PATENT DOCUMENTS

| | | | |
|---|---|---|---|
| 7,243,082 B1* | 7/2007 | Forlai | 705/37 |
| 7,536,336 B1* | 5/2009 | Guinan | 705/37 |
| 7,848,940 B1* | 12/2010 | Harniman et al. | 705/5 |
| 2001/0014868 A1* | 8/2001 | Herz et al. | 705/14 |
| 2001/0034694 A1* | 10/2001 | Elias | 705/37 |
| 2002/0004735 A1* | 1/2002 | Gross | 705/10 |
| 2002/0007330 A1* | 1/2002 | Kumar et al. | 705/36 |
| 2002/0046056 A1* | 4/2002 | Demarco et al. | 705/1 |
| 2002/0055898 A1* | 5/2002 | Burakoff et al. | 705/35 |
| 2002/0073043 A1* | 6/2002 | Herman et al. | 705/64 |
| 2002/0120548 A1* | 8/2002 | Etkin | 705/37 |
| 2002/0138342 A1* | 9/2002 | Clark et al. | 705/14 |
| 2002/0161640 A1* | 10/2002 | Wolfe | 705/14 |
| 2002/0161644 A1* | 10/2002 | Duffield | 705/14 |
| 2002/0169664 A1* | 11/2002 | Walker et al. | 705/14 |
| 2003/0158844 A1* | 8/2003 | Kramer et al. | 707/6 |
| 2003/0216993 A1* | 11/2003 | Goldwerger et al. | 705/37 |
| 2004/0031856 A1* | 2/2004 | Atsmon et al. | 235/492 |
| 2004/0098323 A1* | 5/2004 | Bowser | 705/35 |
| 2004/0162778 A1* | 8/2004 | Kramer et al. | 705/40 |
| 2006/0031108 A1* | 2/2006 | Oran | 705/9 |
| 2006/0206394 A1* | 9/2006 | Brown et al. | 705/26 |
| 2007/0005426 A1* | 1/2007 | Walker et al. | 705/14 |
| 2007/0005427 A1* | 1/2007 | Walker et al. | 705/14 |
| 2008/0201472 A1* | 8/2008 | Bistriceanu et al. | 709/225 |

OTHER PUBLICATIONS

"Here's How to Get the Most Out of Net Access", www.mbna.com; Feb. 20, 2002; pp. 1-2.

"New Technology to Solve Major Marketing Challenge: How to Deliver Personalization with Privacy on the Internet"; www.encirq.com; May 22, 2000; pp. 1-4.

Encirq Partners with Synovus Financial Affiliates and Launches the Illuminated Statement to Online Cardholders; www.encirq.com; May 31, 2001; pp. 1-4.

"How it Works"; www.encirq.com; Jan. 25, 2002; pp. 1-3.

"Illuminated Statement"; www.encirq.com, Jan. 25, 2002; pp. 1-2.

"Illuminated Statement Features and Benefits"; www.encirq.com; Jan. 25, 2002; pp. 1-2.

Search and Examination Report in corresponding GB application 0303770.2, dated Jul. 9, 2003.

Search report in corresponding Irish Patent 84384, dated Jul. 18, 2003.

U.S. Appl. No. 12/900,261—Office Action dated Nov. 9, 2011.

* cited by examiner

Transactions appearing below will be included in your next statement scheduled to close on 02/06/2002.

| Posting Date | Transaction Date | Ref # | Card Type | Category | Transactions | Charges | Credits (CR) |
|---|---|---|---|---|---|---|---|
| 10/13/2001 | 10/12/2001 | 7759 | MC | C | MERCHANT 1, CITY, STATE | $39.99 | |
| 10/15/2001 | 10/12/2001 | 0156 | MC | C | MERCHANT 2, CITY, STATE | $14.99 | |
| 10/26/2001 | 10/24/2001 | 2977 | MC | C | SAVE MERCHANT 3, CITY, STATE | $26.47 | |
| 10/27/2001 | 10/25/2001 | 0031 | MC | C | MERCHANT 4, CITY, STATE | $47.50 | |
| 10/31/2001 | 10/29/2001 | 6006 | MC | C | SAVE MERCHANT 5, CITY, STATE | $86.00 | |
| 10/31/2001 | 10/30/2001 | 3366 | MC | C | MERCHANT 6, CITY, STATE | $69.90 | |
| 11/03/2001 | 11/01/2001 | 0872 | MC | C | MERCHANT 7, CITY, STATE | $30.29 | |
| 11/05/2001 | 11/03/2001 | 7814 | MC | C | MERCHANT 8, CITY, STATE | $37.89 | |
| 11/06/2001 | 11/03/2001 | 6051 | MC | C | MERCHANT 9, CITY, STATE | $41.63 | |
| 11/06/2001 | 11/03/2001 | 8722 | MC | C | MERCHANT 10, CITY, STATE | $269.03 | |
| 11/06/2001 | 11/05/2001 | 4066 | MC | C | MERCHANT 11, CITY, STATE | $31.20 | |

| Snapshot | Statements | Payments | Account Services | Cash Access | Quick Links: Transfer Balances ▶ Go |
|---|---|---|---|---|---|
| Statements | Registered Accounts | Download Statement | | | |

November 2002 Statement — 401

Credit Card Name
Acct # ending XXXX
First Name, Last Name
Billing Address

This is not an official statement

Choose another month: November 2002 ▶

— 402

| Account # | Credit Line | Cash or Credit Avail. | Days in Billing Cycle | Closing Date | Total Min. Payment Due | Payment Due Date |
|---|---|---|---|---|---|---|
| Ending in XXXX | $6,300.00 | $405 $286.41 | 31 | 11/02/2001 | 406 $113.00 | 406 12/02/2001 |

— 409

| Posting Date | Transaction Date | Ref # | Card Type | Category | Transactions | | Charges | Credits (CR) |
|---|---|---|---|---|---|---|---|---|
| | | | | | PAYMENTS AND CREDITS | | | |
| 10/09/2001 | 10/09/2001 | 2655 | VS | | PAYMENT - THANK YOU | | | $500.00 CR |
| 11/02/2001 | 09/03/2001 | 3003 | VS | | PAYMENT - THANK YOU | | | $141.00 CR |
| 11/02/2001 | 11/02/2001 | 0000 | VS | | BONUS BUCKS REBATE | | | $34.12 CR |
| | | | | | PURCHASES AND ADJUSTMENTS | | | |
| 10/15/2001 | 10/12/2001 | 0076 | VS | C | MERCHANT 1 —419 | | $236.58 | |
| 10/19/2001 | 10/18/2001 | 7495 | VS | C | MERCHANT 2 | | $37.00 | |
| 10/30/2001 | 10/29/2001 | 2899 | VS | C | MERCHANT 3 —420 VALUE | | $22.90 | |
| | | | | | ORDER NO. MAS102075937941 0 —1101 | | | |
| 11/02/2001 | 10/23/2001 | 4018 | VS | C | MERCHANT 4 | | $10.00 | |
| 11/02/2001 | 10/23/2001 | 4018 | VS | C | MERCHANT 5 | | $10.00 | |
| | | | | | BONUS BUCKS | | | |
| | | | | | 3.17 MONTHLY EARNED | | | |

411  412  413  414  415  416  417  418

— 410

SYSTEM FOR PROVIDING AN ONLINE ACCOUNT STATEMENT HAVING HYPERLINKS

CROSS-REFERENCE TO RELATED APPLICATIONS

This application claims the priority of U.S. patent application Ser. No. 10/078,162, filed Feb. 20, 2002, which is incorporated herein by reference

BACKGROUND OF THE INVENTION

1. Field of the Invention

The present invention relates generally to an Internet web site providing an online account statement web page having hyperlinks, and especially having hyperlinked special offer indicia for a special offer related to a transaction entry on the online account statement.

2. Related Art

Currently, credit card companies and the like provide online access for their customers to obtain information regarding a credit card account of the customer. The customer can access the information on the credit card account from a web site of the credit card company via the Internet. Such information generally available at a web site of a credit card company includes balance information, payment information, available cash, total minimum payment due, and a transaction history. Such web sites may also contain advertisements having a hyperlink to the advertising merchant. However, such advertisements are not related to the transactions of the customer. Instead, the advertisements are, for example, displayed on each web page viewed by a customer or displayed on a revolving basis with other advertisements on various web pages viewed by customers.

SUMMARY OF THE INVENTION

In an exemplary embodiment of the invention, a customer accesses a web site to obtain information regarding an account of the customer. The web site is maintained by or for the company with which the customer has the account. An online account statement is provided for the customer and includes a transaction history of the account. The transaction history includes linked indicia for transactions listed in the transaction history. The linked indicia include, for example, hyperlinked merchant names and hyperlinked special offer indicia. The hyperlinked special offers provide the customer with special offers from merchants listed in the transaction history, or can even be used to proffer special offers from other merchants offering related and/or competing products and/or services. Each hyperlinked special offer identified for the customer is directly related to a transaction entry in the transaction history of the online account statement of the customer.

With the invention, a customer is provided with special offers that relate to prior transactions of the customer identified within the transaction history. The special offers are provided when the customer reviews the transaction history. Merchants with whom the customer has had previous transactions have an opportunity for additional transactions via the invention, and merchants offering related, complementary, and/or competing products and/or services have the opportunity to initiate a relationship with the customer. Further, a customer accessing the online account statement can self-serve, identify unknown transactions, and contact merchants directly to resolve billing disputes.

The invention is a server side application and not a client side application. The customer does not need to download, for example, a thin client to his/her computer to take advantage of the features of the invention.

The system of the invention includes a computer system including at least one computer-readable medium having software to provide online account statements for accounts of customers of a company. The at least one computer-readable medium comprising: a transaction database comprising a transaction history for an account of a customer of the company, the transaction history comprising a transaction entry, the transaction entry comprising a merchant name for a merchant; a merchant database comprising variations of merchant names for merchants; software to compare the merchant name of the transaction entry of the transaction history from the transaction database with the variations of merchant names from the merchant database; software to provide a hyperlinked special offer indicia if a match occurs between the merchant name from the transaction database and one of the variations of merchant names from the merchant database, the hyperlinked special offer indicia corresponding to a special offer based on the transaction entry; and software to provide an online account statement web page to the customer via the network, the online account statement web page comprising the transaction history of the account of the customer, the transaction history comprising the transaction entry, the transaction entry comprising the merchant name and the hyperlinked special offer indicia.

The method of the invention includes a method for providing online account statements for accounts of customers of a company. The method comprises the steps of: maintaining a transaction database comprising a transaction history for an account of a customer of the company, the transaction history comprising a transaction entry, the transaction entry comprising a merchant name for a merchant; maintaining a merchant database comprising variations of merchant names for merchants; comparing the merchant name of the transaction entry of the transaction history from the transaction database with the variations of merchant names from the merchant database; providing a hyperlinked special offer indicia if a match occurs between the merchant name from the transaction database and one of the variations of merchant names from the merchant database, the hyperlinked special offer indicia corresponding to a special offer based on the transaction entry; and providing an online account statement web page to the customer via the network, the online account statement web page comprising the transaction history of the account of the customer, the transaction history comprising the transaction entry, the transaction entry comprising the merchant name and the hyperlinked special offer indicia.

The system of the invention includes a computer system including a computer-readable medium having software to operate a computer in accordance with the invention.

The apparatus of the invention includes a computer including a computer-readable medium having software to operate the computer in accordance with the invention.

The article of manufacture of the invention includes a computer-readable medium having software to operate a computer in accordance with the invention.

Further features and advantages of the invention, as well as the structure and operation of various embodiments of the invention, are described in detail below with reference to the accompanying drawings.

DEFINITIONS

A "computer" refers to any apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a workstation; a micro-computer; a server; an interactive television; a web appliance; a telecommunications device with internet access; a hybrid combination of a computer and an interactive television; and application-specific hardware to emulate a computer and/or software. A computer can be stationary or portable. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include: a magnetic hard disk; a floppy disk; an optical disk, such as a CD-ROM and a DVD; a magnetic tape; a memory chip; and a carrier wave used to carry computer-readable electronic data, such as those used in transmitting and receiving e-mail or in accessing a network.

"Software" refers to prescribed rules to operate a computer. Examples of software include: software; code segments; instructions; computer programs; and programmed logic.

A "computer system" refers to a system having a computer, where the computer comprises a computer-readable medium embodying software to operate the computer.

A "network" refers to a number of computers and associated devices that are connected by communication facilities. A network involves permanent connections such as cables or temporary connections such as those made through telephone, wireless, or other communication links. Examples of a network include: an internet, such as the Internet; an intranet; a local area network (LAN); a wide area network (WAN); and a combination of networks, such as an internet and an intranet.

BRIEF DESCRIPTION OF THE DRAWINGS

The foregoing and other features and advantages of the invention will be apparent from the following, more particular description of a preferred embodiment of the invention, as illustrated in the accompanying drawings. The left most digits in the corresponding reference number indicate the drawing in which an element first appears.

FIG. 11 illustrates an exemplary online account statement web page for a second exemplary embodiment of the invention.

DETAILED DESCRIPTION OF THE EXEMPLARY EMBODIMENT OF THE INVENTION

An exemplary embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention. The embodiments and examples discussed herein are non-limiting examples.

A company provides online account statements for its customers via a web site provided by or for the company. The company can be, for example, a credit card company, a debit card company, a bank, a savings and loan, a brokerage firm, a financial institution, a department store, a store selling goods and/or services, a catalogue merchant, a telecommunications company, a utility company, an Internet-based company, a rewards program provider, a technology provider for such companies, or the like. After initially enrolling with the web site, a customer can log in to the web site to view an online account statement for one or more accounts with the company. For an account selected, or if the customer has a single account with the company, an online account statement web page is provided for the account. The online account statement web page includes a transaction history of the account.

The transaction history includes hyperlinked indicia for transactions listed in the transaction history. The linked indicia includes, for example, hyperlinked merchant names and hyperlinked special offer indicia. The hyperlinked special offer indicia provide the customer with special offers from merchants listed in the transaction history and/or from related and/or competing merchants. The hyperlinked special offers identified for the customer are related to the transaction entries in the transaction history of the online account statement web page for the customer. The special offers can be customized for the customer.

The special offer provided by the hyperlink of the online account statement can be provided only to customers who are enrolled with the online account statement service. The special offer can be redeemable, for example, online at the merchant web site, at a physical merchant location by a printable coupon, or via a telephone through use of a special tracking code.

Figure 1:
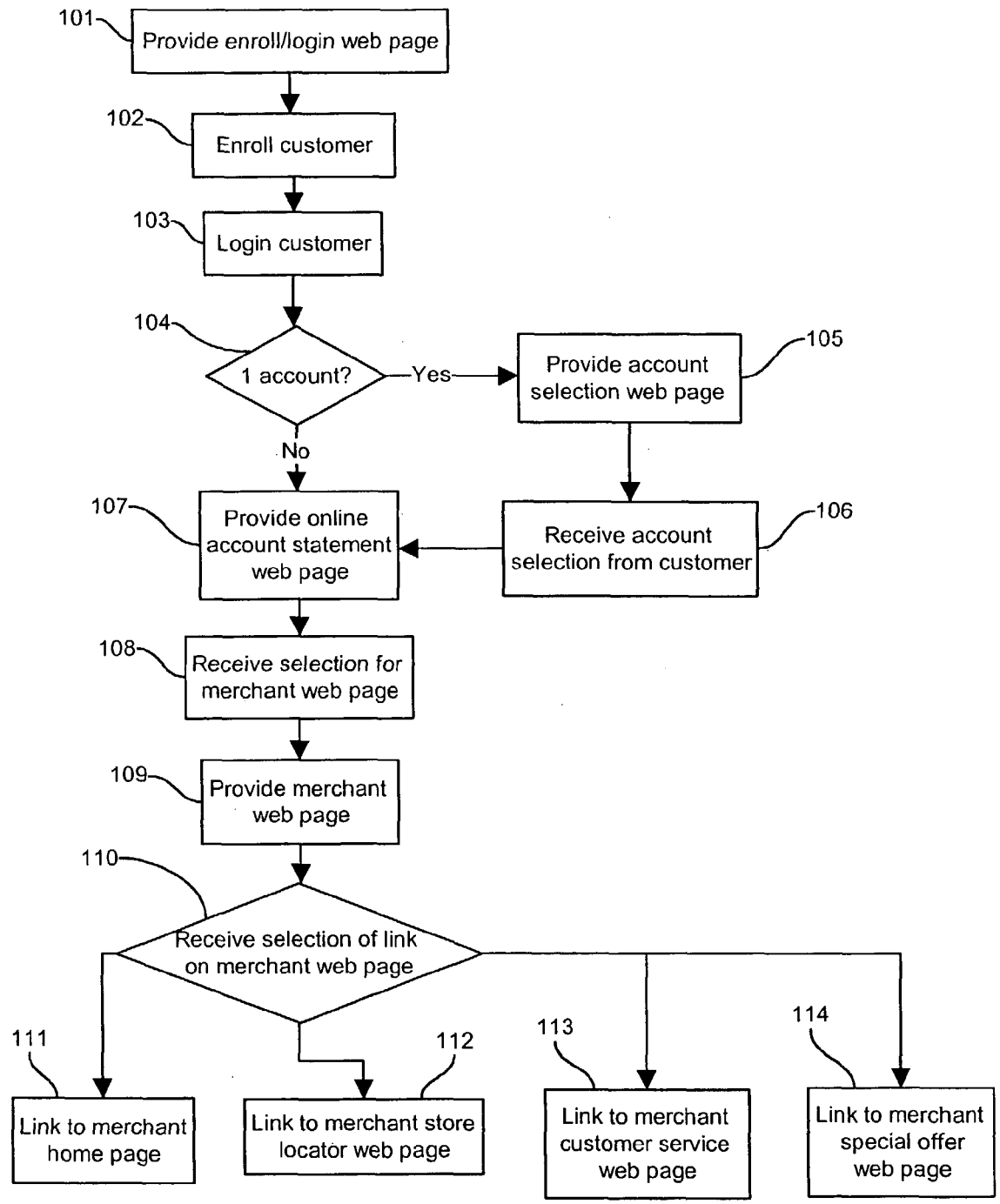
FIG. 1 illustrates a flowchart of an exemplary embodiment of the invention.

FIG. 1 illustrates a flowchart for an exemplary embodiment of the invention. The flowchart illustrated in FIG. 1 is with reference to a web site provided by or for a company providing online account statements for its customers. The invention is provided by a server side and not a client side in a client-server relationship.

FIG. 1 is discussed in relation to FIGS. 2-7, which illustrate exemplary web pages for an exemplary embodiment of the invention. For the exemplary embodiment illustrated with the FIGS. 2-7, the company is a credit card company, and the online account statement is an online credit card account statement.

Figure 2:
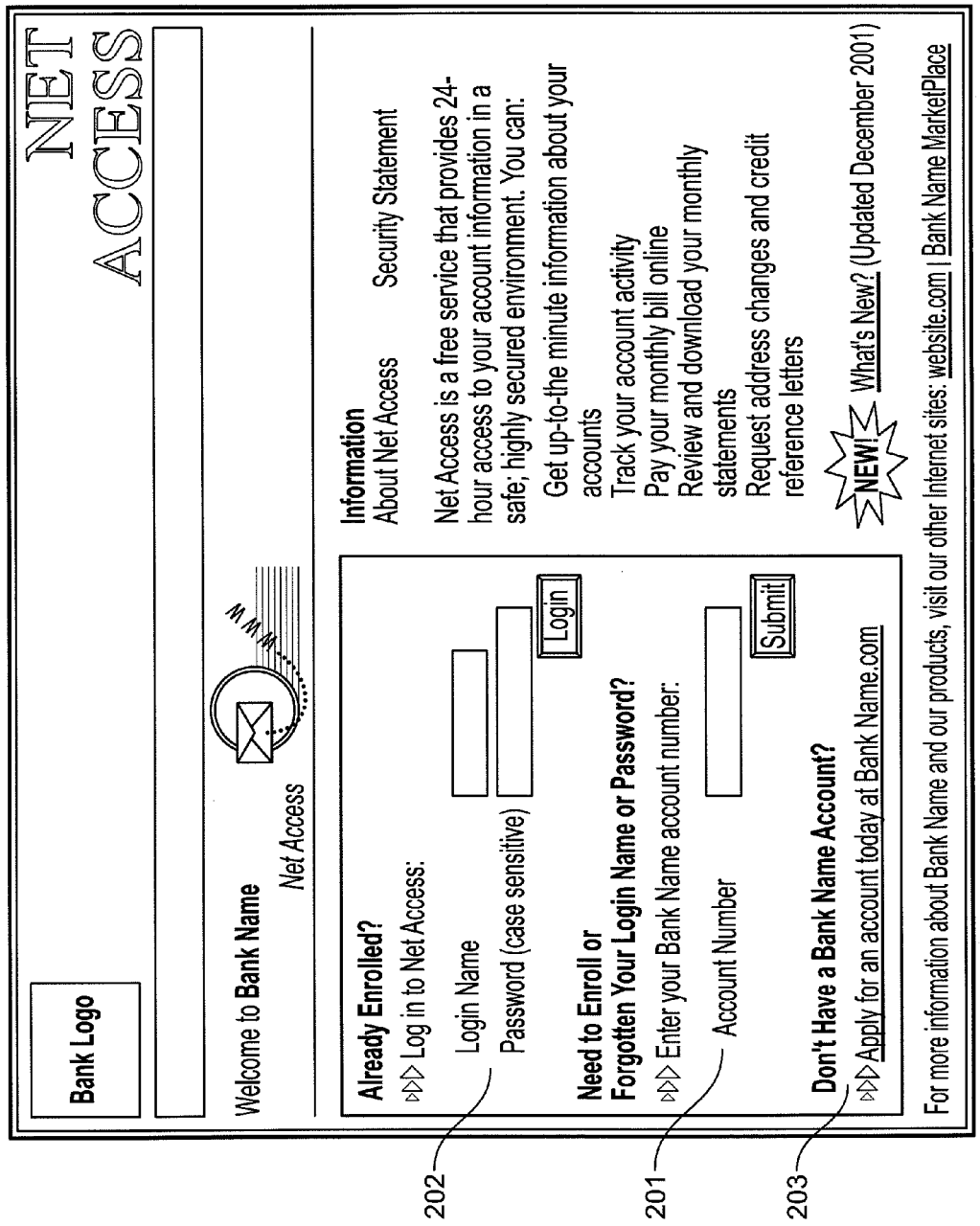
FIG. 2 illustrates an exemplary enroll/login web page.

In block 101 of FIG. 1, an enrollment/login web page is initially provided. An exemplary enroll/login web page for an exemplary embodiment of the invention is illustrated in FIG. 2. This initial page is provided to all customers desiring access to their online account statements.

In block 102, if a customer desiring to access the online account statement is accessing the web site for the first time, the customer is enrolled. A customer is enrolled by entering, for example: a valid account number (e.g., area 201); verifying specific pieces of information (e.g., card verification code (CVC), card verification value (CVV), mother's maiden name, and/or social security number); and selecting a user name and a password. Upon enrollment, the customer accepts terms and conditions for receiving the online account statement.

In block 103, once the customer is enrolled, the customer can log in. To log in, the customer is required to enter a correct user name and password combination. If the customer is already enrolled, the customer can log in (e.g., area 202).

The enroll/login web page can also provide for accepting users who are not yet customers of the company (e.g., area 203).

Once logged in, the web site determines in block 104 if the customer has more than one account. If the customer has more than one account, flow proceeds to block 105. If the customer has one account, flow proceeds to block 107.

Figure 3:
FIG. 3 illustrates an exemplary account selection web page.

In block 105, an account selection web page is provided as an interstitial web page. An exemplary account selection web page for an exemplary embodiment of the invention is illustrated in FIG. 3. The account selection web page lists the multiple accounts of the customer (e.g., area 301). The customer is requested to select one of the displayed accounts. In block 106, the web site receives an account selection from the customer. Once the account selection is received, flow proceeds to block 107.

Figure 4:
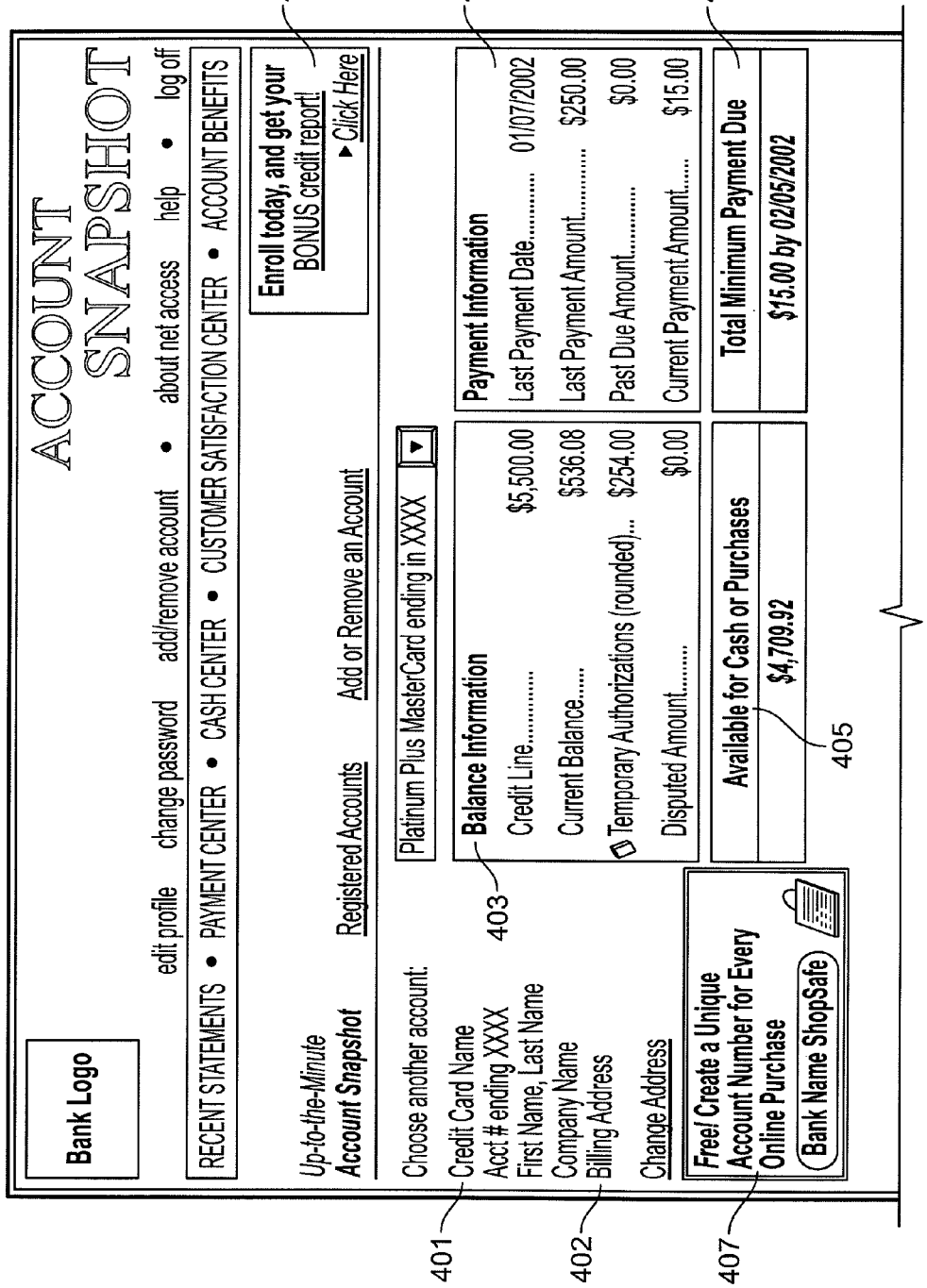
FIG. 4 illustrates an exemplary online account statement web page.

In block 107, an online account statement web page is provided for the customer. An exemplary online account statement web page is illustrated in FIG. 4 for an exemplary embodiment of the invention. The online account statement page can include customer information for the account, for example: customer name (e.g., area 401); billing address (e.g., area 402); telephone number; balance information for the account (e.g., area 403); payment information for the account (e.g., area 404); available credit for the account (e.g., area 405); a total minimum payment due and corresponding due date for the account (e.g., area 406); and any current offers being promoted by the company unrelated to the transaction history of the customer (e.g., conventional advertising of products and/or services of the company). The online account statement may also include advertisements form third parties, which are unrelated to the transaction history of the customer (e.g., areas 407 and 408).

The online account statement includes a transaction history (e.g., area 409). The transaction history can be for current activity or past activity of the account of the customer. Current activity can include, for example, all activity in the account since the most recent statement date. Past activity of the account can include, for example, activity from one or more previous statements, from one or more payments on the account, from a year (e.g., a year end account report), from a rolling period (e.g., the past 4 weeks or the past 12 months), or from a predetermined or customer selected date range. As an option, an interstitial web page can be provided to the customer with a selection of current activity, for example, since the most recent statement, past activity from one or more previous statements, or activity over a date range.

The transaction history of the online account statement includes zero or more transaction entries (e.g., area 410). Each transaction entry corresponds to a discrete activity of the account. Each transaction entry in the transaction history can include fields for, for example: a posting date (e.g., area 411), which is the date the entry was posted to the account; a transaction date (e.g., area 412), which is the date the merchant entered as the date of the transaction; a reference number (e.g., area 413), which is a reference number associated with the transaction to identify individual transactions for merchant processing, settlement, and dispute; a card type (e.g., area 414), which is an identifier of the type of card, such as MC for a MasterCard credit card, V for a Visa credit card, A for an American Express credit card, and a D for a Discover credit card; a category (e.g., area 415), which is a category designating how the charge is to be treated for purposes of calculating finance charges, such as, C for retail purchases at the annual percentage rate (APR) for retail purchases and A for transferred balances at the APR for transferred balances; a merchant description (e.g., area 416), including, for example, a merchant name (e.g., "XXX#0611/THE"), a merchant address (e.g., "CITY, STATE"), and an optional merchant telephone number; a charge (e.g., area 417) for the amount charged to the account for the transaction entry; and a credit (e.g., area 418) for the amount credited to the account for the transaction entry.

One or more of the transaction entries in the transaction history are displayed as hyperlinked transaction entries. A hyperlinked transaction entry can be designated, for example, by varying the format of the transaction entry (e.g., underline, bold, italics, color, and/or font size) for some or all of the transaction entry. When the user clicks on the hyperlinked transaction entry, a merchant web page is opened that contains information specific to that merchant and/or the transaction entry. In FIG. 4, a hyperlinked transaction entry is designated via a hyperlinked merchant name. FIG. 4 includes non-hyperlinked merchant names (e.g., area 419) and hyperlinked merchant names (e.g., area 420). For area 420, the exemplary hyperlinked merchant name is underlined (i.e., XXX#0611/THE) and in a different color than the rest of the transaction history.

Each transaction entry can include one or more hyperlinked special offer indicia related to the transaction entry. For example, the indicia can be a red icon shaped like a sales tag and having the word "SAVE" therein (e.g., area 421). The hyperlinked special offer indicia can be situated as part of the transaction entry. For example, the hyperlinked special offer indicia can be directly adjacent to, approximately next to, or collocated with the merchant name in the transaction entry. Other techniques can be used to draw attention to a special offer related to the transaction history, for example: a red icon shaped like a sales tag and having the word "VALUE" or other special offer word or words therein; a special icon (e.g., a gold star) to indicate a special offer or a special merchant; an icon indicating the type of savings (e.g., "%" indicating a percentage off or "$" indicating a credit or dollars off); or a rollover pop-up image and text box. By clicking on the hyperlinked special offer indicia, a merchant web page is opened that contains one or more special offers related to the respective transaction entry in the transaction history.

As an option, instead of opening a merchant web page, an online registration form is provided when the customer clicks on the hyperlinked special offer indicia. The registration form can be for, for example: a product and/or a service of the merchant; a warranty; or a reservation (e.g., a reservation for a restaurant, a movie, a play, a concert, or travel). The registration form can be populated with information provided by the customer when the customer enrolled. For example, the name, telephone number, e-mail address, credit card number, and/or substitute credit card number of the customer obtained during enrollment of the customer can be used to populate the registration form. The customer can complete any additional information required on the registration form and can elect to send the registration form to the merchant. If the customer so elects, the registration form is passed to the merchant, and the merchant thereafter contacts the customer regarding the special offer.

For each different merchant name, each hyperlinked special offer indicia can have a different hyperlink (e.g., areas 421 and 422).

As an option, the same merchant name can have different hyperlinked special offer indicia. With this option, the special offer for the transaction entry can be selected based on, for example, a rolling serial determination, a random determination, a determination based on an analysis of the transaction entry and/or the customer. For example, if the merchant is a company selling camping equipment, various special offers are available depending on the analysis of the transaction entry. For instance, if the transaction entry is for a customer having a transaction with the company, a special offer of free shipping is offered; if the transaction entry is for a customer having a transaction with a competitor of the company, a special offer of $5 off is offered; and if the transaction entry is for a customer having a transaction with a related merchant to the company (e.g., a campground), a special offer of free shipping and 10% off is offered.

As another option, the same merchant name can have one or more different hyperlinked special offer indicia associated therewith. Decisions on which special offers to offer the customer and how many can be selected are based on, for example, a rolling serial determination, a random determination, a determination based on an analysis of the transaction entry and/or the customer. For example, if the merchant is a company selling camping equipment, two special offers are selected. For instance, a first special offer of free shipping is offered from the merchant, and a second special offer is offered for a related merchant (e.g., a campground) for a free night at the campground if two are booked.

When the online account statement page is generated for the customer, the web site determines for each transaction entry in the transaction history whether the transaction entry is hyperlinked and whether a special offer is associated with the transaction entry. The selection of which transaction entries in the transaction history to hyperlink and which to provide special offers is discussed further below with respect to FIGS. 8-10.

As an option, the online account statement can include a hyperlinked special offer summary indicia. The indicia is hyperlinked to a web page that presents a listing and/or a description of all matched merchants having special offers related to the transaction history of the customer. The listing can be arranged, for example, chronologically per the transaction history, alphabetically, in a predetermined ranking based on arrangements between the merchants and the company, or the like. The listing can coincide with the date range in the transaction history or can be different (e.g., a predetermined date range, such as the last 6 months, or a customer selected date range).

As a further option, the hyperlinked special offer summary indicia can be a summary box in, for example, the heading of the online account statement. The summary box can identify the various merchants having special offers related to the transaction history of the customer. The summary box can include a personal message for the customer.

In block 108 of FIG. 1, the customer clicks on a hyperlink in the transaction history indicating a selection for a merchant web page, and the selection is received by the web server. For example, referring to FIG. 6, the customer clicks on a hyperlinked merchant name (e.g., XXX#0611/THE of area 420) or clicks on a hyperlinked special offer indicia (e.g., the "SAVE" tag of area 421).

Figure 5:
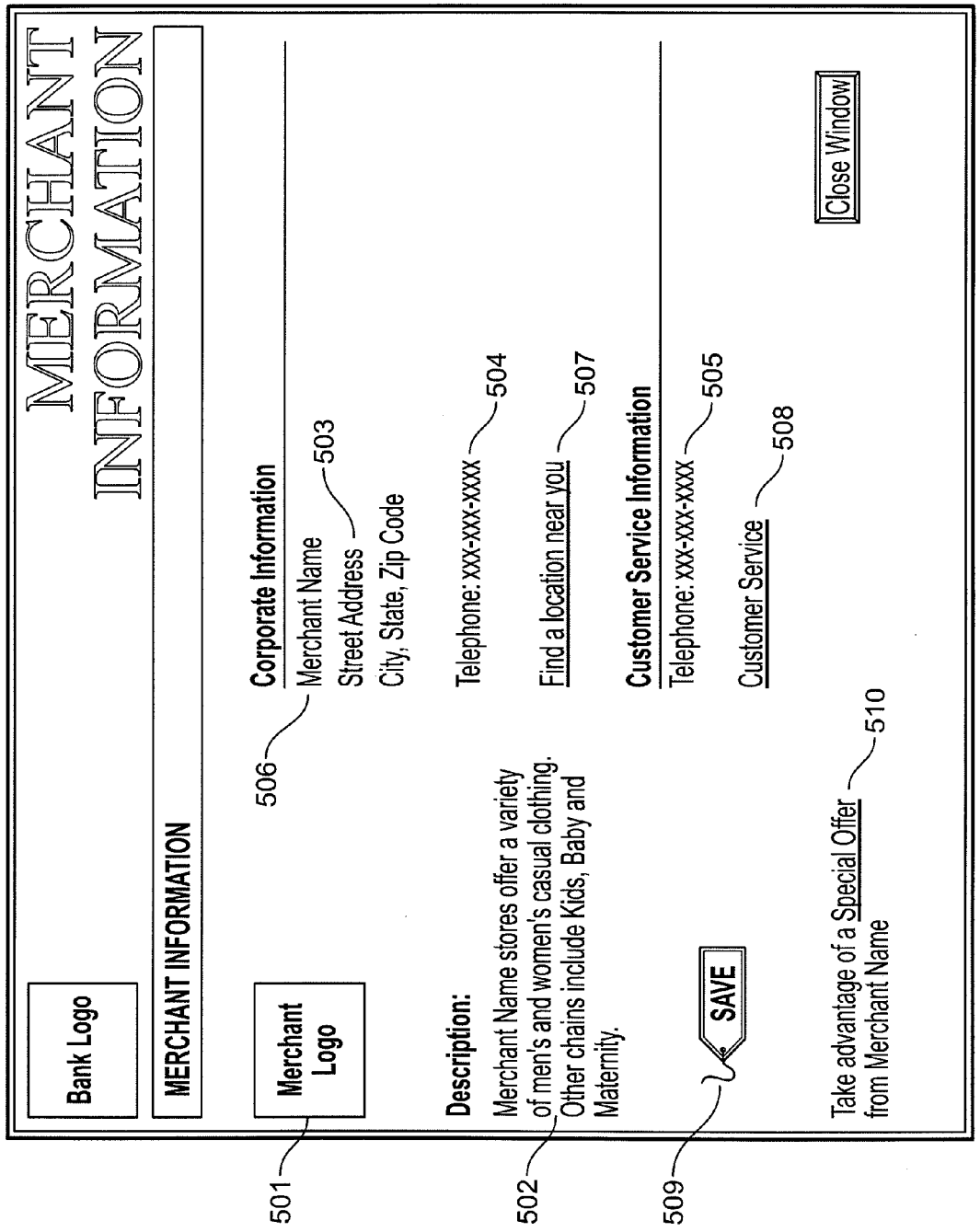
FIG. 5 illustrates an exemplary merchant home page.

In block 109, the merchant web page is provided to the customer. An exemplary merchant web page for an exemplary embodiment of the invention is illustrated in FIG. 5. The web server for the company with which the customer has the account, and not the web server for the merchant, generates the merchant web page. The merchant web page includes, for example: a merchant logo (e.g., area 501); a merchant description (e.g., area 502); a merchant name and a merchant address (e.g., area 503); a merchant telephone number (e.g., area 504); a merchant customer service telephone number (e.g., area 505); a hyperlinked merchant home page indicia (e.g., area 506); a hyperlinked merchant store locator web page indicia (e.g., area 507); a hyperlinked merchant customer service web page indicia (e.g., area 508); and a hyperlinked special offer indicia (e.g., areas 509 and 510). The hyperlinked special offer indicia can be, for example, a stylized red tag having the word "SAVE" therein. Other types of indicia can be used as discussed above for the hyperlinked special offer indicia of the online account statement web page.

As an option, the merchant web page can include a hyperlinked dispute resolution indicia. With this feature, a dispute resolution regarding a transaction entry in the transaction history is initiated. The indicia is hyperlinked to, for example, a web page for the company (e.g., an e-form for the customer to fill out) or another web site to resolve the dispute. The hyperlinked dispute resolution indicia can also be provided as part of the online account statement.

In block 110, the web server receives a selection from the customer for one of the hyperlinks on the merchant web page. If the customer clicks on the hyperlinked merchant home page indicia (e.g., area 506), flow proceeds to block 111. If the customer clicks on the hyperlinked merchant store locator web page indicia (e.g., area 507), flow proceeds to block 112. If the customer clicks on the hyperlinked merchant customer service web page indicia (e.g., area 508), flow proceeds to block 113. If the customer clicks on the hyperlinked special offer indicia (e.g., area 509 or area 510), flow proceeds to block 114.

Figure 6:
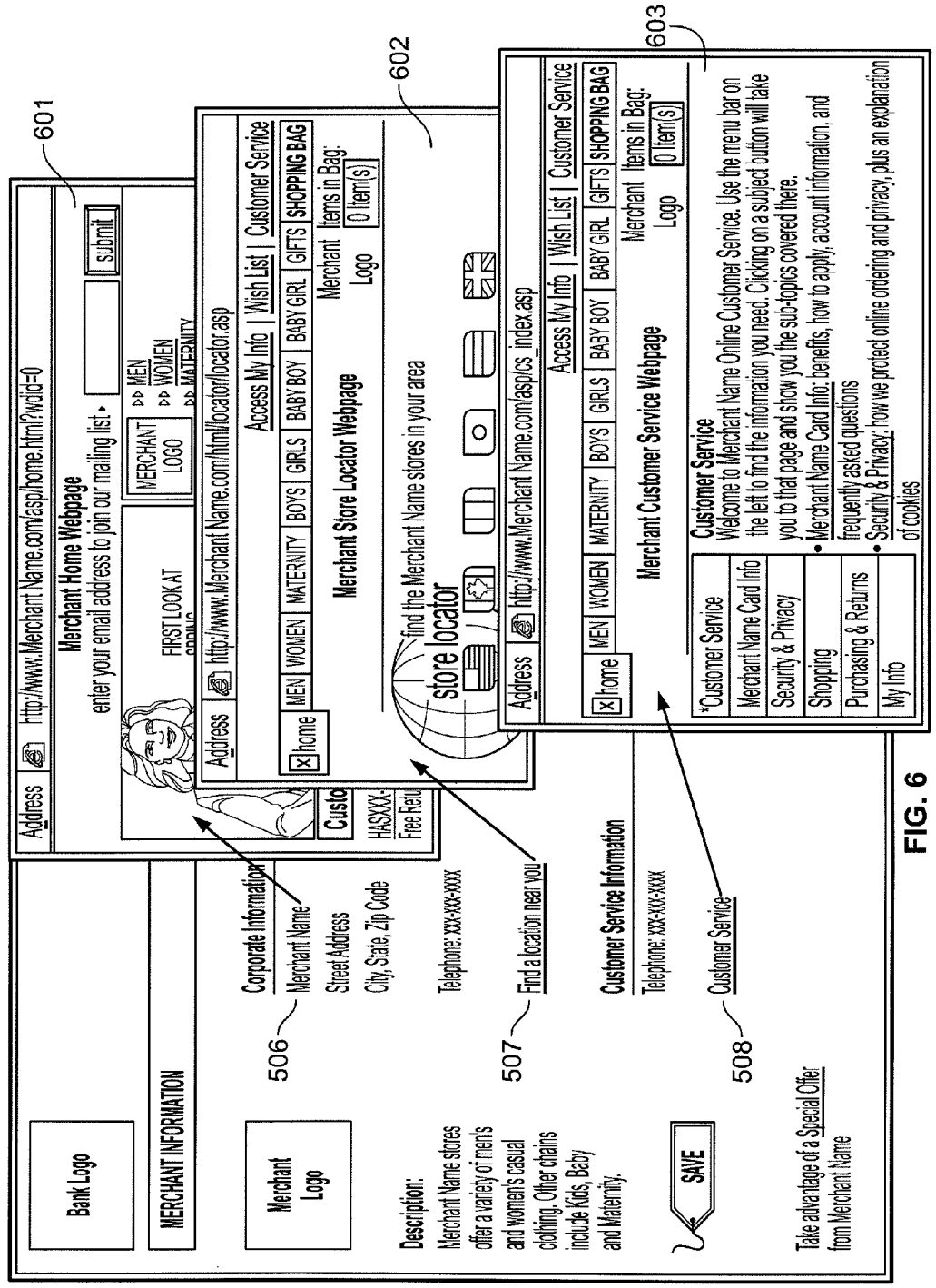
FIG. 6 illustrates an exemplary merchant web page with links to the merchant web site.

In block 111, the customer clicked on the hyperlinked merchant home page indicia, and the customer is linked to the merchant home page. An exemplary merchant web page with links to the merchant web site for an exemplary embodiment of the invention is illustrated in FIG. 6. By clicking on a hyperlinked merchant home page indicia (e.g., area 506), the merchant home page (e.g., area 601) is displayed.

In block 112, the customer clicked on the hyperlinked merchant store locator web page indicia on the merchant web page, and the customer is linked to the merchant store locator web page. Referring to the example in FIG. 6, by clicking on a hyperlinked merchant store locator web page indicia (e.g., area 507), the merchant store locator web page (e.g., area 602) is displayed.

In block 113, the customer clicked on the hyperlinked merchant customer service web page indicia on the merchant web page, and the customer is linked to the merchant customer service web page. Referring to the example in FIG. 6, by clicking on a hyperlinked merchant customer service web page indicia (e.g., area 508), the merchant customer service web page (e.g., area 603) is displayed.

Figure 7:
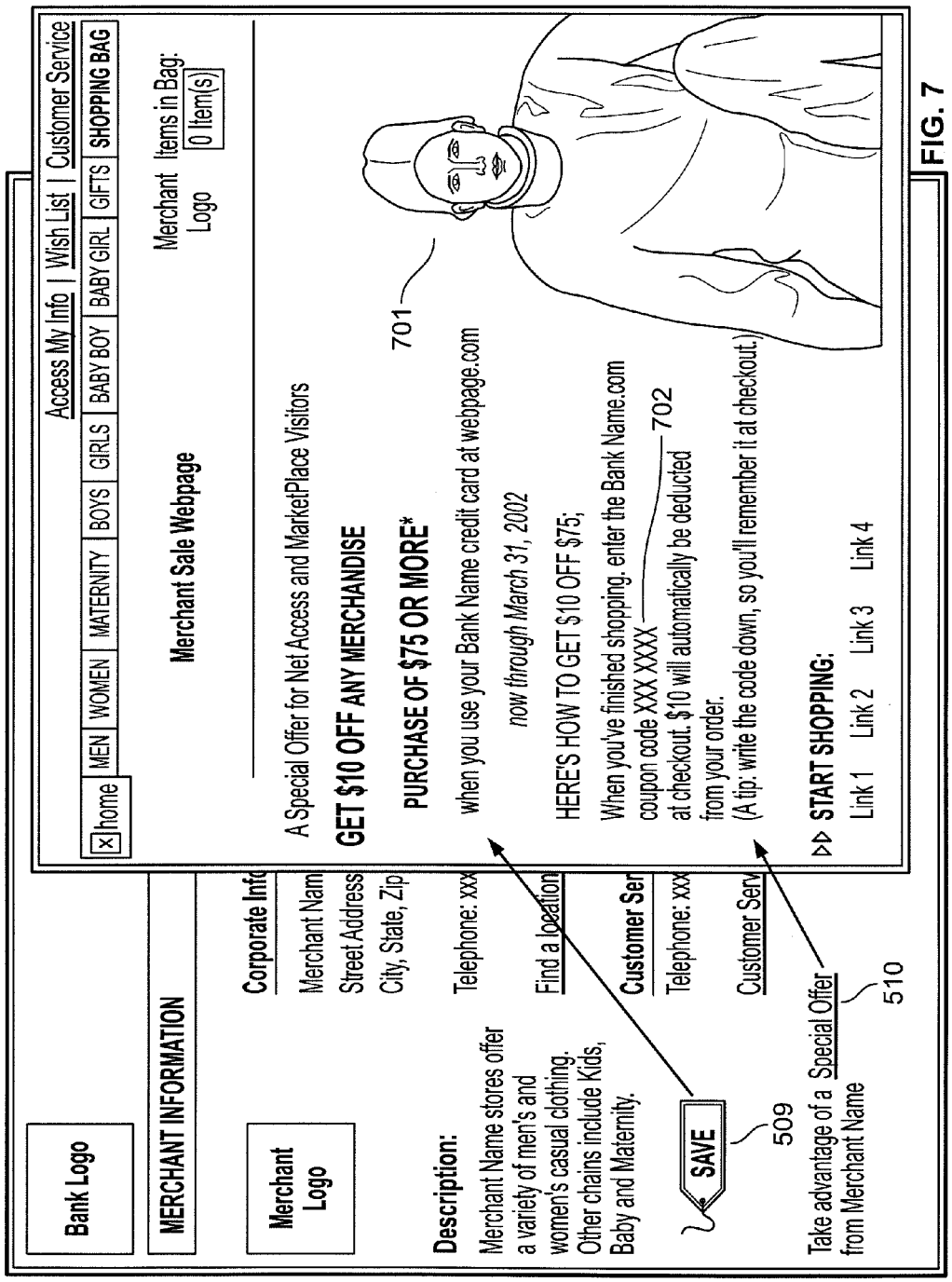
FIG. 7 illustrates an exemplary merchant web page with a link to a merchant special offer web page.

In block 114, if the customer clicked on the hyperlinked special offer indicia on the merchant web page, the customer is linked to a merchant special offer web page. An exemplary merchant special offer web page for an exemplary embodiment of the invention is illustrated in FIG. 7. By clicking on a hyperlinked merchant home page indicia (e.g., area 509 or area 510), a merchant special offer web page (e.g., area 701) is displayed. The merchant special offer web page can be, for example: an advertisement for a special offer (e.g., a sale or a credit) from the merchant; a special offer customized to the customer; loyalty program information; a web page having hyperlinks for various products and/or services of the merchant; or an interstitial web page. The special offer provided on the merchant special offer web page can be used for online shopping with the merchant, a printable coupon for taking to the merchant, or information for use with a telephone sale with the merchant.

The merchant special offer web page can include a special offer code (e.g., area 702). The special offer code can be used by the customer for one or more additional transactions with the merchant. The special offer code can uniquely identify the special offer, the company providing the account to the customer, and/or the customer. In FIG. 7, the special offer code in area 702 is used in this example for online shopping with the merchant.

The merchant special offer web page can be established only to be available via navigating the online account statement. The merchant can use tracking codes obtained via the path navigation to the merchant special offer web page and beyond to fulfill the special offer and to report on one or more orders and/or closed sales.

As an option, the merchant special offer web page is for a special offer for a company different from the merchant identified in the transaction entry of the online account statement web page. Instead, the special offer can be from, for example: a subsidiary or related company; a partner company; a merchant selling a related and/or complimentary product and/or service (for example, if the customer purchased a boat, the related merchant sells nautical supplies or boat trailers); or a competitor of the merchant identified in the transaction entry. As an example, a transaction entry in the transaction history for a fine restaurant can have a hyperlinked special offer indicia from the restaurant itself, another fine restaurant in the same vicinity, and/or a gourmet foods distributor. To distinguish the types of special offers, hyperlinked special offer indicia from the merchant in the transaction entry can be one style, and hyperlinked special offer indicia from a merchant different from the one in the transaction entry can be another style (e.g., a different icon, color, or font).

As an option, and as discussed above, the merchant special offer web page can include special offers from one or more merchants.

As an option, the merchant special offer web page can include an active accept indicia with the special offer. The active accept indicia can be, for example, a radio button with the text "Accept Offer" or "Buy Now." The active accept indicia can be, for example, located next to or incorporated with the special offer. If the customer clicks on the active accept indicia, the customer accepts the special offer, and an order is automatically placed with the merchant using the information provided by the customer when the customer enrolled. The enrollment information regarding the customer is transmitted to the merchant to fill the accepted special offer. The enrollment information of the customer transmitted to the merchant can include, for example: name, telephone number, e-mail address, credit card number or substitute credit card number, and/or expiration date of credit card. By clicking on the active accept indicia, the customer can accept the special offer without needing to navigate through additional web pages or the merchant's web site.

As an option, if the customer clicks on a hyperlinked special offer indicia in the online account statement web page (e.g., area 421), flow can proceed directly from block 108 to block 114 without displaying the merchant web page.

In blocks 111-114, the web pages created can be static web pages and/or dynamic web pages (i.e., web pages created on the fly). These web pages can be generated either by the web server of or for the company having the account with the customer or by the web site provided by or for the merchant presenting the material in the provided web page. The web pages are generated on the server side and not the client side. No additional software is needed by the customer on the client side to generate the web pages. The provided web page can be opened within the web browser used by the customer, or it can be opened in a separate window.

Figure 8:
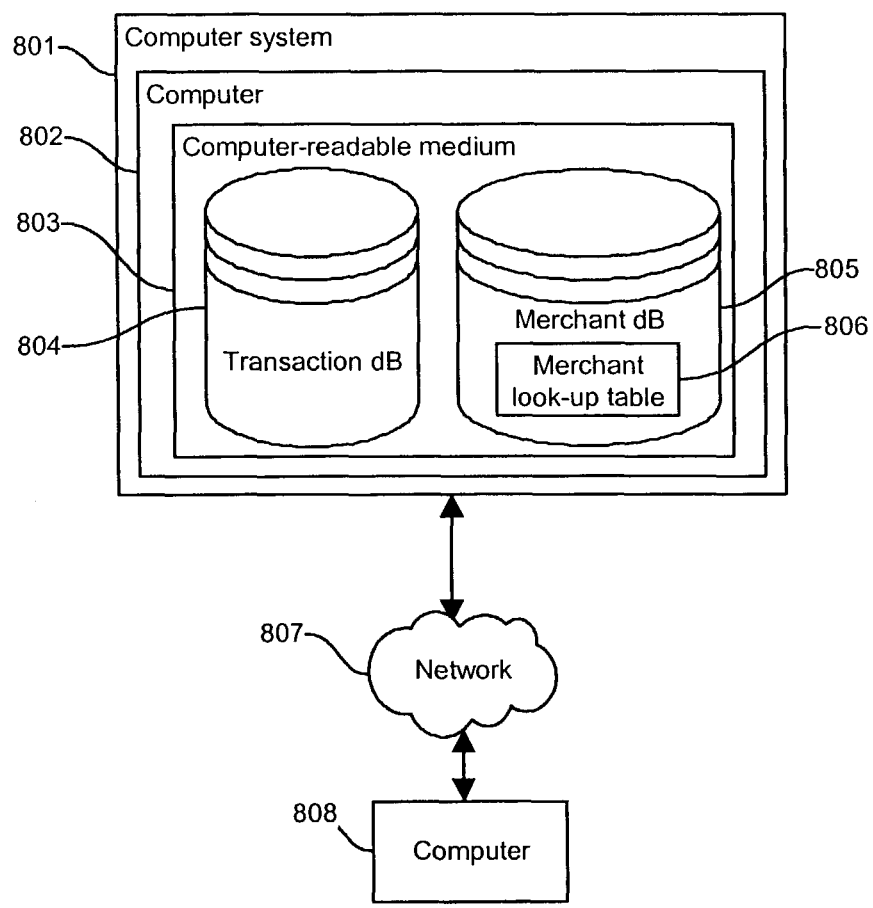
FIG. 8 illustrates a plan view for a computer system for the invention.

FIG. 8 illustrates a plan view for a computer system for implementing a web site of the invention. The computer system 801 includes a computer 802 for implementing the invention. The computer 802 includes a computer-readable medium 803 having software for implementing the invention and/or software to operate the computer 802 in accordance with the invention. The computer-readable medium 803 additionally includes a transaction database 804 and a merchant database 805. The merchant database 805 includes a merchant look-up table 806. The computer system 801 includes a connection to a network 807. A computer 808 also includes a connection to the network 807. The computer system 801 and the computer 808 communicate via the network 807.

In an exemplary embodiment, the computer system 801 implements a web server and provides web pages in accordance with the invention, and the network 807 is the Internet. The computer 808 includes a web browser, communicates with the web server implemented by the computer system 801, and receives web pages from the computer system 801. The server side (i.e., the computer system 801), and not the client side (i.e., the computer 808), provides the web pages. As an option, the computer 808 can be a computer system.

In FIG. 8, software, the transaction database 804, and the merchant database 805 are described and illustrated as part of the computer-readable medium 803. Alternatively, software, the transaction database 804, and the merchant database 805 can more generally be part of the computer 802 or the computer system 801.

In FIG. 8, the transaction database 804 and the merchant database 805 are illustrated as part of the computer 802. Alternatively, the transaction database 804 can be incorporated more generally as part of the computer system 801. Likewise, the merchant database 805 can be incorporated more generally as part of the computer system 801.

The transaction database 804 contains information for populating the online account statement web page (e.g., FIG. 4). For each customer, the transaction database 804 includes a transaction history for each account of each customer of the company. Each transaction history includes the transaction entries described above.

The merchant database 805 contains information for populating the merchant web page (e.g., FIG. 5). The merchant database 805 includes merchant entries for a number of merchants that can be identified in the transaction history in the online account statement. In generating the merchant web page in block 109, the computer system 801 accesses a merchant entry in the merchant database 805 to populate the merchant web page.

Figure 9:
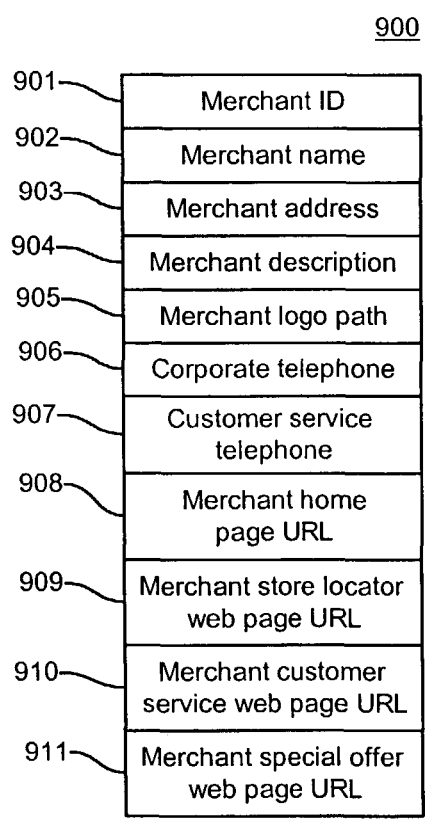
FIG. 9 illustrates an exemplary merchant entry for the merchant database.

FIG. 9 illustrates an exemplary merchant entry 900 in the merchant database. The merchant entry 900 includes the following fields, for example: a merchant identification 901; a merchant name 902; a merchant address 903; a merchant description 904; a merchant logo path 905; a merchant corporate telephone number 906; a merchant corporate customer service telephone number 907; a merchant home page uniform resource locator (URL) 908; a merchant store locator web page URL 909; a merchant customer service web page URL 910; and a merchant special offer web page URL 911. For more than one special offer, additional merchant special offer web page URL's are provided. The additional special offers can be from the merchant and/or one or more other merchants. Other possible fields for the merchant entry include: a merchant rating URL (e.g., as available online from the Better Business Bureau (BBB)); additional merchant special offer web page URLs; special offer descriptions; merchant offer image path; and icon paths for a print button for printable coupon redemption, a telephone button for telephone coupon redemption, or a computer button for online coupon redemption. Each of the fields (or optionally zero or more of the fields) for the merchant entry 900 has an on/off indicator to control when the data is to be displayed on the merchant web page.

Referring to the exemplary merchant web page in FIG. 5, the merchant name 902 and the merchant address 903 are used to populate area 503. The merchant description 904 is used to populate area 502. The merchant logo path 905 is used to identify the path for displaying the merchant logo in area 501. The merchant corporate telephone number 906 is used to populate area 504. The merchant customer service telephone number 907 is used to populate area 505. The merchant home page URL 908 is used to provide the hyperlink for area 506. The merchant store locator web page URL 909 is used to provide the hyperlink for area 507. The merchant customer service web page URL 910 is used to provide the hyperlink for area 508. The merchant special offer web page URL 911 is used to provide the hyperlink for areas 509 and 510.

Figure 10:
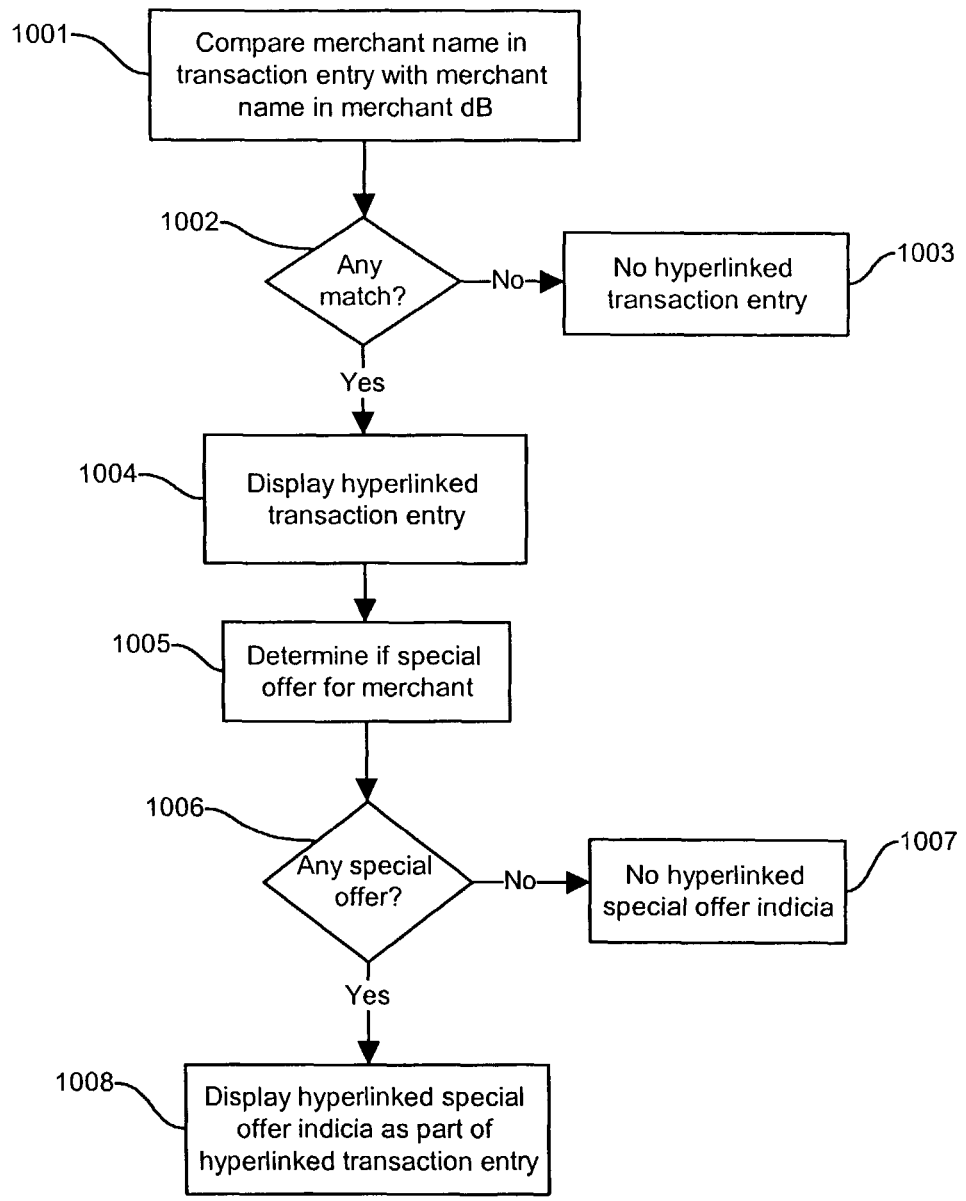
FIG. 10 illustrates a flow chart for analyzing a merchant name in the transaction history.

FIG. 10 illustrates a flow chart for analyzing a merchant name in the transaction history of the online account statement. Specifically, the flowchart is for determining whether a transaction entry in the transaction history should be indicated as a hyperlinked transaction entry (e.g., a hyperlinked merchant name) and whether a hyperlinked special offer indicia should be included with the transaction entry.

In block 1001, for each merchant name in each transaction entry in the transaction history of the online account statement web page, the computer system 801 compares the merchant name from the transaction database 804 with variations on the merchant name in the merchant database 805. The computer system 801 determines if the merchant name from the transaction database 804 matches with a merchant name 902 in the merchant database 805. To assist in the matching, the merchant look-up table 806 is provided. The merchant look-up table 806 includes possible variations of the merchant name for a merchant in the transaction history. For example, for the merchant name 902 of "YYY-YYYY," potential occurrences of the merchant name may include: "YYY-YYYY Store 123" and "YYY-YYYY Store 234."

As a supplement to, or instead of, using the merchant look-up table 806, wildcard-based queries can be provided for potential iterations of the merchant name. For example, for the merchant name "YYY-YYYY," and if the wildcard is an asterisk ("*"), the following wildcard entries can be included, for example, in the merchant look-up table 806: "*YYY-YYYY*," "*YYY-YYYY," and "*Wal Mart*."

In block 1002, it is determined if a match occurred between the merchant name in the transaction history and a merchant name 902 in the merchant database 805. If a match did not occur, flow proceeds to block 1003. If a match occurred, flow proceeds to block 1004.

In block 1003, no match occurred, and the transaction entry in the transaction history of the online account statement for the merchant is not indicated as being hyperlinked (e.g., area 419 in FIG. 4).

In block 1004, the merchant name for the transaction entry in the transaction database 804 matched with a merchant name 902 in the merchant database 805. The transaction entry for the transaction history of the online account statement is displayed as a hyperlinked transaction entry (e.g., area 420 in FIG. 4).

In block 1005, it is determined if a special offer exists for the merchant identified in the transaction entry. Initially, the on/off indicator for the merchant special offer web page URL 911 is examined. If the on/off indicator is off, no special offer exists for the merchant. If the on/off indicator is on, a special offer may exist. Next, the presence of an entry in the field 911 is determined. If no entry in the field 911 is present, no special offer exists for the merchant. If an entry in the field 911 is present, a special offer exists for the merchant. The same conditions are checked for additional merchant special offer web page URL's.

In block 1006, if a special offer does not exist, flow proceeds to block 1007, and if a special offer exists, flow proceeds to block 1008.

In block 1007, a special offer does not exist, and the transaction entry is displayed as a hyperlinked transaction entry in the transaction history of the online account statement (e.g., area 420 in FIG. 4).

In block 1008, a special offer exists, and a hyperlinked special offer indicia (e.g., area 421 in FIG. 4) is displayed with the hyperlinked transaction entry in the transaction history of the online account statement (e.g., area 420 in FIG. 4).

As an option, flow can proceed from block 1003 to block 1005. With this option, in block 1007, the transaction entry is displayed as determined in block 1003, and in block 1008, the transaction entry is not displayed as a hyperlinked transaction entry but does include a hyperlinked special offer indicia. As an example of this option, a merchant name in a transaction entry of the transaction history is not hyperlinked, but a hyperlinked special offer indicia is located next to the merchant name in the transaction entry for a special offer from a competitor of the merchant named in the transaction entry.

Figure 12:
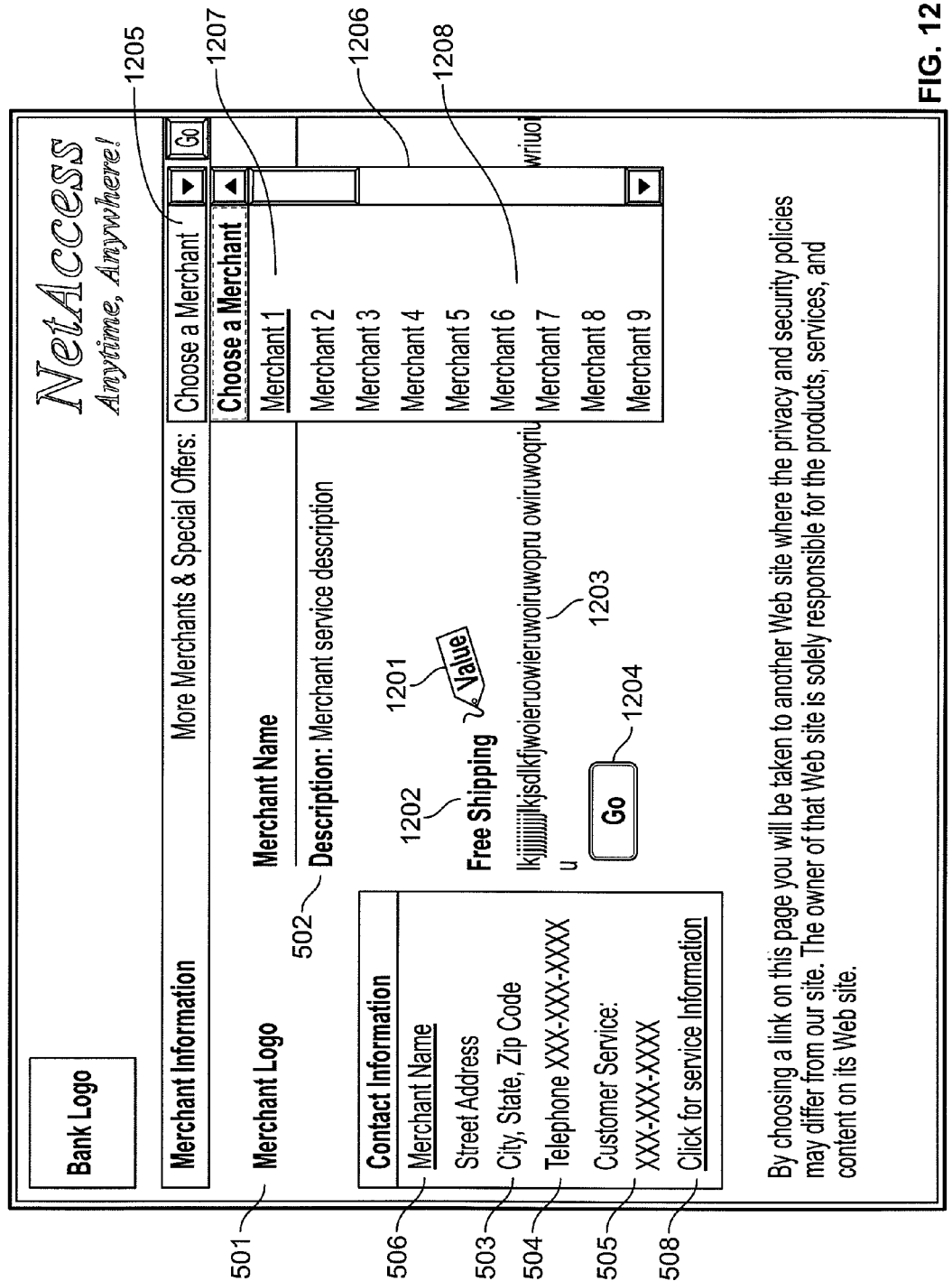
FIG. 12 illustrates an exemplary merchant web page for the second exemplary embodiment.
Figure 13:
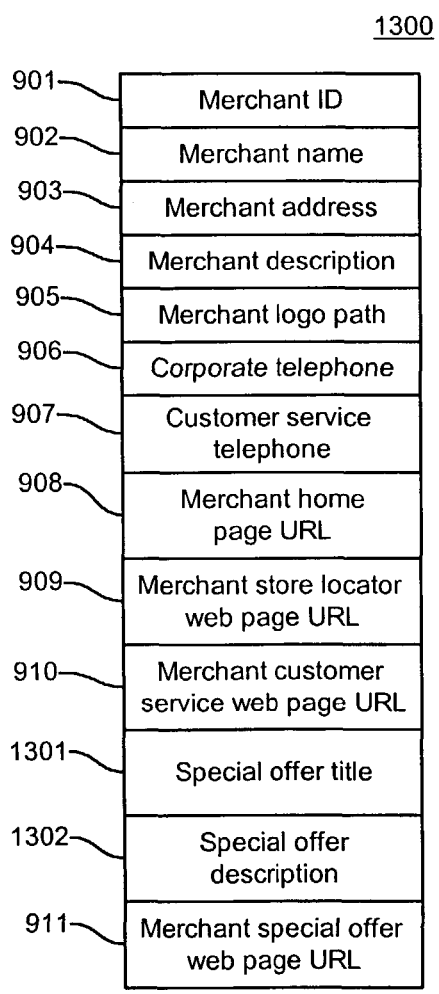
FIG. 13 illustrates an exemplary merchant entry for the merchant database for the second exemplary embodiment.

The previous discussion of the invention is hereinafter referred to as the first exemplary embodiment of the invention. In a second exemplary embodiment of the invention, a description of the special offer is provided with the merchant web page. With such a description, the inventors discovered that a much higher than expected number of customers clicked on the special offer indicia on the merchant web page. FIGS. 11-13 illustrate the second exemplary embodiment of the invention.

FIG. 11 illustrates an exemplary online account statement web page for the second exemplary embodiment of the invention. The exemplary online account statement web page of FIG. 11 is similar to the exemplary online account statement web page of FIG. 4 but in a different format. The features in FIG. 11 that are the same as those in FIG. 4 are identified with the same reference numerals as those in FIG. 4. A distinguishing difference between the exemplary online account statement web pages of FIGS. 4 and 11 is the hyperlinked special order indicia. In FIG. 11, the exemplary hyperlinked special order indicia is a red icon shaped like a sales tag and having the word "VALUE" therein (e.g., area 1101), whereas the exemplary hyperlinked special order indicia in FIG. 4 is a red icon shaped like a sales tag and having the word "SAVE" therein (e.g., area 421). As explained above, by clicking on the hyperlinked special offer indicia, a merchant web page is opened that contains one or more special offers related to the respective transaction entry in the transaction history.

A distinguishing difference between the merchant web pages of the first and second exemplary embodiments is the description of the special offer. In the second exemplary embodiment, a description of the special offer is included with the merchant web page provided in block 109. In contrast, for the first exemplary embodiment, a description of the special offer is provided in the merchant special offer web page from block 114. FIG. 12 illustrates an exemplary merchant web page for the second exemplary embodiment. The exemplary merchant web page of FIG. 12 is similar to the exemplary merchant web page of FIG. 5, and the features in FIG. 12 that are the same as those in FIG. 5 are identified with the same reference numerals as those in FIG. 5.

Including the features discussed above for a merchant web page in the first exemplary embodiment, a merchant web page of the second exemplary embodiment includes: a hyperlinked special offer indicia (e.g., area 1201); a title or brief description for the special offer (e.g., area 1202); a description of the special offer (e.g., area 1203); and an additional information indicia, such as a radio button (e.g., area 1204). (The exemplary description of the special offer in area 1203 is for illustration purposes and exemplifies text.) Other types of indicia besides the stylized red tag can be used for the hyperlinked special offer indicia as discussed above for the hyperlinked special offer indicia of the online account statement web page. To access the merchant special offer web page via block 114, the user clicks on the hyperlinked special offer indicia (e.g., area 1201) or the additional information indicia (e.g., area 1204).

Another difference between the merchant web pages of the first and second exemplary embodiments is the inclusion of additional special offers on the merchant web page of the second exemplary embodiment. The additional special offers provide the customer with access to special offers beyond the initial one selected. The additional special offers can be provided, for example: directly on the merchant web page; via a menu selection, such as a drop-down menu of various merchants and/or special offers; or via an interstitial web page providing selections of various merchants and/or special offers. If the additional special offers are provided directly on the merchant web page, a similar format can be used as for the single special offer (e.g., areas 1201-1204), and/or any other web page presentation technique can be used (e.g., banners, pop-up windows, and/or child windows).

For example, in FIG. 12, if the user clicks on a drop-down menu selector (e.g., area 1205), a drop-down menu (e.g., area 1206) is displayed. The drop-down menu contains a listing of merchants and/or special offers for the customer. The merchants and/or special offers can be selected based on, for example: a rolling serial determination, a random determination, or a determination based on an analysis of the transaction entry and/or the customer. For the example in FIG. 12, merchants with or related transactions in the transaction history are displayed in one section of the drop-down menu (e.g., area 1207), and other merchants (e.g., without or unrelated to transactions in the transaction history) are displayed in another section of the drop-down menu (e.g., area 1208). Clicking on a merchant and/or special offer in the drop-down menu provides for the customer a merchant web page corresponding to the clicked-on merchant and/or special offer.

To populate the merchant web page of the second exemplary embodiment, appropriate fields are added to the merchant entries in the merchant database 805. FIG. 13 illustrates an exemplary merchant entry 1300 in the merchant database for the second exemplary embodiment of the invention. In addition to the exemplary fields discussed above for the exemplary merchant entry 900, the exemplary merchant entry 1300 includes the following fields, for example: a special offer title 1301; and a special offer description 1302. Referring to the exemplary merchant web page in FIG. 12, the special offer title 1301 is used to populate area 1202, and the special offer description 1302 is used to populate area 1203.

Figure 14:
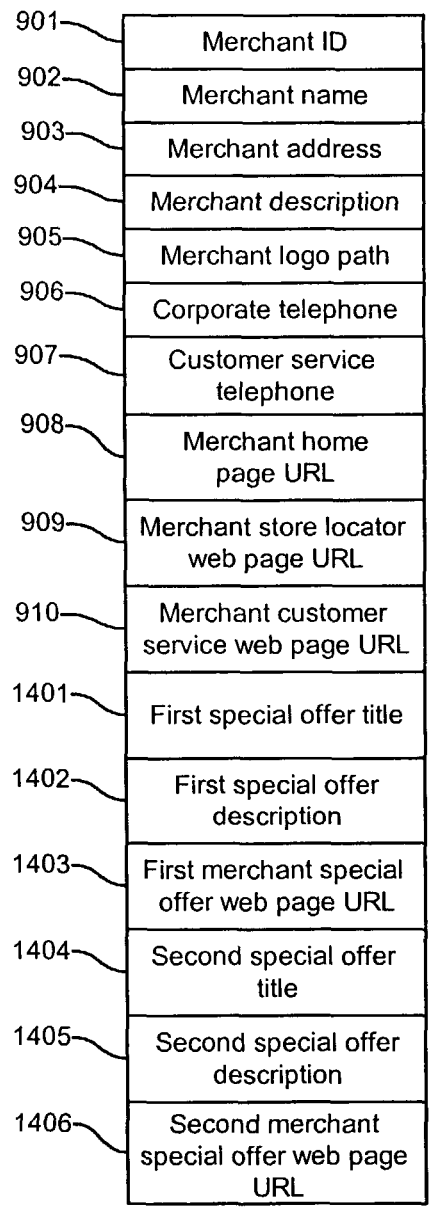
FIG. 14 illustrates an optional exemplary merchant entry for the merchant database for the second exemplary embodiment.

As an option to having a single special offer, a number of special offers can be associated with a merchant, as discussed above for the first exemplary embodiment. For each additional special offer, appropriate fields are added to the merchant entries in the merchant database 805. FIG. 14 illustrates an exemplary merchant entry 1400 in the merchant database for this option. In addition to the exemplary fields discussed above for the exemplary merchant entry 900, the exemplary merchant entry 1400 includes the following fields, for example, for two special offers: a first special offer title 1401; a first special offer description 1402; a first merchant special offer web page URL 1403; a second special offer title 1404; a second special offer description 1405; and a second merchant special offer web page URL 1406. For more than two special offers, similar additional fields can be added to the merchant entry. The one or more special offers can be from the merchant and/or one or more other merchants.

Although the invention has been described for use with the Internet, web servers, and web pages, other types of networks, networking devices, and networked displayable information can be used with the invention, as will be appreciated by those skilled in the art.

The embodiments and examples discussed herein are non-limiting examples.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A computer system comprising at least one computer-readable medium having software to provide online account statements for accounts of customers of a company, said at least one computer-readable medium comprising:
  a transaction database comprising a transaction history for an account of a customer of said company, said transaction history comprising at least one transaction entry, said transaction entry comprising a merchant name for a first merchant;
  a merchant database comprising variations on said merchant name for said first merchant;
  a first set of computer executable instructions to compare said merchant name of said at least one transaction entry from said transaction database with said variations on said merchant name from said merchant database;
  a second set of computer executable instructions to provide a hyperlinked special offer indicia if a match occurs between said merchant name from said transaction database and one of said variations on said merchant name from said merchant database, to select said hyperlinked special offer indicia from a plurality of hyperlinked special offer indicia based on at least one of a rolling serial determination and a random determination, to determine whether there is a related special offer corresponding to a second merchant that is identified by a name different than the merchant name and said variations of said merchant name, and to provide a related hyperlinked special offer indicia with the hyperlinked special offer indicia when the related special offer has been determined; and a third set of computer executable instructions to provide an online account statement web page to said customer via said network, said online account statement web page comprising said transaction history of said account of said customer, said transaction history comprising said transaction entry, said transaction entry comprising said merchant name, said hyperlinked special offer indicia corresponding to said first merchant, and said related hyperlinked special offer indicia corresponding to said second merchant.

2. A computer system as in claim 1, wherein said hyperlinked special offer indicia is adjacent to said merchant name in said at least one transaction entry in said transaction history of said online account statement web page.

3. A computer system as in claim 1, wherein said hyperlinked special offer indicia is hyperlinked to a merchant web page, said merchant web page comprising second hyperlinked special offer indicia.

4. A computer system as in claim 3, wherein said merchant web page further comprises a description of said special offer.

5. A computer system as in claim 1, wherein said hyperlinked special offer indicia is hyperlinked to a merchant special offer web page comprising a description of said special offer.

6. A computer system as in claim 1, wherein said special offer is provided by said first merchant.

7. A computer system as in claim 1, wherein said special offer is provided by a company different from said first merchant and said second merchant.

8. A computer system as in claim 1, wherein said transaction history of said online account statement comprises a second transaction entry, said second transaction entry having second hyperlinked special offer indicia, said second hyperlinked special offer indicia corresponding to a second special offer different from said special offer.

9. A computer system as in claim 1, wherein said computer system further comprises:

a fourth set of computer executable instructions to provide said at least one transaction entry as a hyperlinked transaction entry if said match occurs between said merchant name from said transaction database and one of said variations on said merchant name from said merchant database.

10. A computer system as in claim 9, wherein the fourth set of computer executable instructions determines whether to configure said merchant name as a hyperlinked merchant name or a non-hyperlinked merchant name in said at least one transaction entry.

11. A computer system as in claim 10, wherein said hyperlinked special offer indicia is adjacent to said hyperlinked merchant name in said hyperlinked transaction entry.

12. A computer system as in claim 1, wherein said online account statement is for a credit card of said customer.

13. The computer system of claim 1, wherein the second set of computer executable instructions provides one or more additional special offers when providing said special offer, wherein each of the one or more additional special offers are each related to said at least one transaction entry and the one or more additional special offers includes the related special offer.

14. A method for providing online account statements for accounts of customers of a company, comprising:

maintaining, by a computer, a transaction database comprising a transaction history for an account of a customer of said company, said transaction history comprising at least one transaction entry, said at least one transaction entry comprising a merchant name for a first merchant;

maintaining, by the computer, a merchant database comprising variations on said merchant name for said first merchant;

comparing, by the computer, said merchant name of said at least one transaction entry of said transaction history from said transaction database with said variations on said merchant name from said merchant database;

providing, by the computer, a hyperlinked special offer indicia if a match occurs between said merchant name from said transaction database and one of said variations on said merchant name from said merchant database, said hyperlinked special offer indicia corresponding to a special offer from said first merchant based on said at least one transaction entry;

selecting, by the computer, said hyperlinked special offer indicia from a plurality of hyperlinked special offer indicia based on at least one of a rolling serial determination and a random determination;

determining, by the computer, whether there is a related special offer for the special offer, said related special offer corresponding to a second merchant that is identified by a name different than the merchant name and said variations of said merchant name;

providing, by the computer, a related hyperlinked special offer indicia with the hyperlinked special offer indicia when the related special offer has been determined;

providing, by the computer, an online account statement web page to said customer via said network, said online account statement web page comprising said transaction history of said account of said customer, said transaction history comprising said at least one transaction entry, said transaction entry comprising said merchant name, said hyperlinked special offer indicia, and said related hyperlinked special offer indicia.

15. A computer-readable storage medium storing computer-readable instructions that, when executed, cause a processor to perform a method comprising:

maintaining a transaction database comprising a transaction history for an account of a customer of said company, said transaction history comprising at least one transaction entry, said at least one transaction entry comprising a merchant name for a first merchant;

maintaining a merchant database comprising variations on said merchant name for said first merchant;

comparing said merchant name of said at least one-transaction entry of said transaction history from said transaction database with said variations on said merchant name from said merchant database;

providing a hyperlinked special offer indicia if a match occurs between said merchant name from said transaction database and one of said variations on said merchant name from said merchant database, said hyperlinked special offer indicia corresponding to a special offer from said first merchant based on said at least one transaction entry;

selecting said hyperlinked special offer indicia from a plurality of hyperlinked special offer indicia based on at least one of a rolling serial determination and a random determination;

determining whether there is a related special offer for the special offer, said related special offer corresponding to a second merchant that is identified by a name different than the merchant name and said variations of said merchant name;

providing a related hyperlinked special offer indicia with the hyperlinked special offer indicia only when the related special offer has been determined;

providing an online account statement web page to said customer via said network, said online account statement web page comprising said transaction history of said account of said customer, said transaction history comprising said at least one transaction entry, said transaction entry comprising said merchant name, said hyperlinked special offer indicia, and said related hyperlinked special offer indicia.

16. A method for providing an online account statement for an account of a customer of a company, comprising:

receiving, by a computer, a request via a network to provide said online account statement for said account of said customer of said company;

providing, by the computer, an online account statement web page via said network, said online account statement web page comprising a transaction history of said account of said customer, said transaction history comprising a transaction entry, said entry comprising a merchant name of a first merchant, a hyperlinked special offer indicia, and a related hyperlinked special offer indicia, said hyperlinked special offer indicia corresponding to a special offer based on said at least one transaction entry, said special offer based on one of variations on said merchant name, said related hyperlinked special offer indicia corresponding to a second merchant that is identified by a name different than the merchant name and the variations of said merchant name, wherein the first merchant and second merchant are competitors; and selecting, by the computer, said hyperlinked special offer indicia from a plurality of hyperlinked special offer indicia based on at least one of a rolling serial determination and a random determination.

17. A method as in claim 16, further comprising:

receiving a request via said network in response to said hyperlinked special offer indicia being selected to provide a merchant web page;

providing said merchant web page via said network, said merchant web page comprising second hyperlinked special offer indicia corresponding to said hyperlinked special offer indicia.

18. A method as in claim 16, wherein said merchant web page further comprises a description of said special offer.

19. A method as in claim 16, wherein said merchant web page further comprises a third hyperlinked special offer indicia corresponding to a second special offer different from said special offer.

20. A method for receiving an online account statement for an account of a customer of a company, comprising:

providing a request via a network to receive said online account statement for said account of said customer of said company; and receiving, by a computer, an online account statement web page via said network, said online account statement web page comprising a transaction history of said account of said customer, said transaction history comprising a transaction entry, said transaction entry comprising a merchant name and a plurality of hyperlinked special offer indicia, said plurality of hyperlinked special offer indicia corresponding to a plurality of special offers, each of the plurality of special offers are related to said transaction entry, wherein at least two of the plurality of special offers are for different merchants, wherein the different merchants are competitors.

21. The computer system of claim 13, wherein the second set of computer executable instructions provides the one or more additional special offers as a listing in a drop-down menu along with one or more unrelated special offers that are unrelated to said at least one transaction entry.

* * * * *